Aug. 28, 1962 R. H. RUBLE 3,050,861
I.D. AND O.D. LIMIT GAGE
Filed May 21, 1958
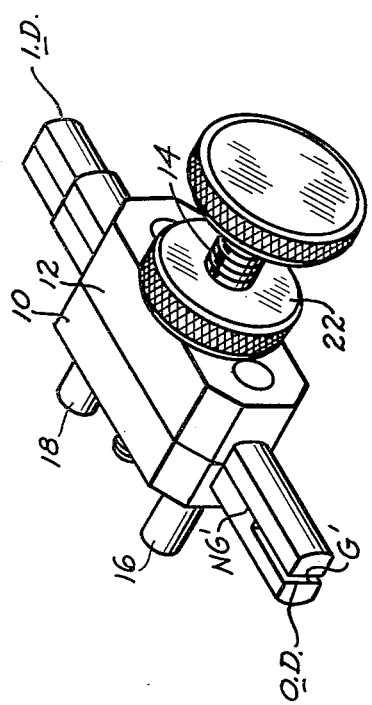
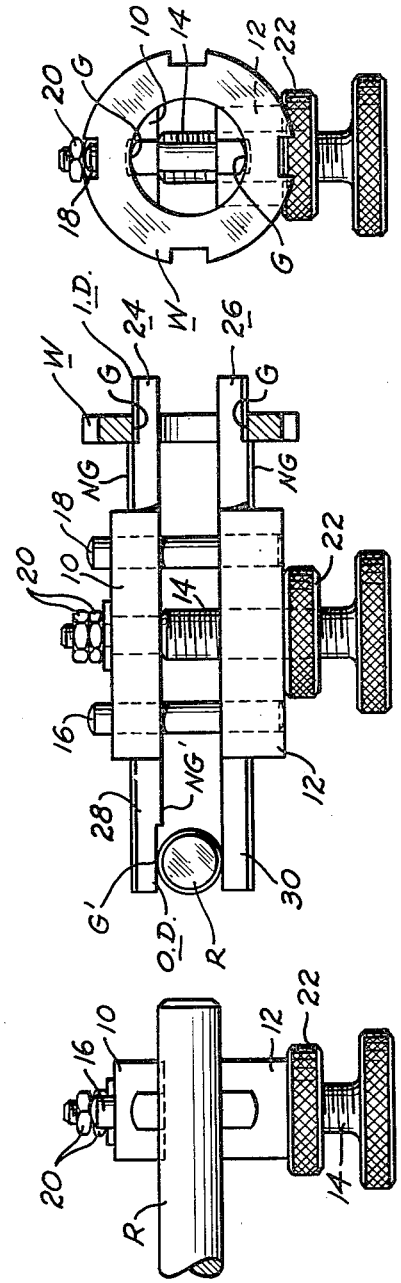
INVENTOR.
ROBERT H. RUBLE.
BY H. O. Clayton
ATTORNEY

United States Patent Office 3,050,861
Patented Aug. 28, 1962

3,050,861
I.D. AND O.D. LIMIT GAGE
Robert H. Ruble, South Bend, Ind., assignor to The Bendix Corporation, a corporation of Delaware
Filed May 21, 1958, Ser. No. 736,795
2 Claims. (Cl. 33—178)

This invention relates in general to gages and in particular to gages for checking either the internal diameter of certain articles of manufacture or the external diameter of other articles of manufacture. For example the adjustable gage of my invention may be used to check the internal diameter of coiled springs.

There is a need, in this art, for an adjustable so-called go, no-go gage which will supplant many double end plug gages and snap gages now in use. It is accordingly an object of my invention to provide an adjustable go, no-go gage unit of only a few major parts, one end of said gage serving to measure the I.D. of an article of manufacture and the other end of said gage serving to measure the O.D. of an article of manufacture.

Other objects of the invention and desirable details of construction of parts will become apparent from the following detailed description of an illustrative embodiment of the invention, taken in conjunction with the accompanying drawing illustrating said embodiment, in which:

FIGURE 1 is an isometric view of the gage constituting my invention;

FIGURE 2 is a side view of the gage of FIGURE 1 disclosing a work piece positioned within the O.D. portion of said gage;

FIGURE 3 is a front view of my gage disclosing the work piece of FIGURE 2 in position within said gage and another work piece positioned on the I.D. portion of the gage; and FIGURE 4 is a side view of my gage looking into the I.D. portion thereof and disclosing the work piece of FIGURE 3.

Referring now to the several figures of the drawing disclosing a preferred embodiment of my invention, two body members 10 and 12, rectangular shaped in cross section through the center thereof and generally parallelepiped in shape, are mounted on a two diametered pin 14. The large diametered portion of the pin 14 is threaded to adjustably mount thereon the body portion 12; and the small diametered portion of the pin extends through an opening in the body portion 10. Pins 16 and 18, extending through openings in the body portions 10 and 12, serve to align said portions with each other; and nuts 20 serve to clamp the body portion 10 in place. After the body portion 12 has been positioned on the pin 14 as desired then a lock nut 22, threadedly mounted on said pin, is screwed tight against the face of said body portion thereby securely holding the same in place.

The I.D. testing portion of my gage consists of two two-diametered fingers 24 and 26, FIGURE 3 extending lengthwise, respectively, from the body portions 10 and 12 and preferably integral therewith. Both fingers are generally rectangular shaped in cross section and have flat inner faces facing each other and rounded outer faces. As is disclosed in FIGURE 3 each of the two fingers is provided with a pre-ground step or so-called go portion G of say .01 inch thickness drop. In other words each step is .01 of an inch drop from the so-called set dimension of a no-go portion NG. This internal diameter or so-called I.D. portion of my gage is indicated generally by the letters I.D.

As to the O.D. testing portion of my gage the O.D. portion consists of two fingers numbered 28 and 30, generally rectangular shaped in cross section and having flat portions facing each other and rounded outer faces. The finger 28 is provided with a pre-ground step or go portion G' of say .02 inch thickness drop. In other words this step portion is .02 of an inch drop from the so-called set dimension of a no-go portion NG' of the finger 28. This outside diameter or so-called O.D. portion of my gage is indicated in general by the letters O.D., FIGURE 3. Both the I.D. and O.D. portions of the gage are set with say a 0–1" micrometer.

In operation after the body portion 12 is mounted on the pin 14 then the body portion 10 is mounted in place to make possible the desired I.D. and O.D. test operations. The pins 16 and 18 are then inserted in the body portions and the gage is ready to be used. If the O.D. of, say, a rod member R is to be checked then said member is inserted in the gage as indicated in FIGURE 3 of the drawings; and if the I.D. of, say, a washer W is to be checked then the washer is sleeved over the fingers 24 and 26 as is disclosed in said figure.

While the preferred embodiment of the invention has been described in considerable detail, I do not wish to be limited to the particular construction shown which may be varied within the scope of the invention, and it is the intention to cover hereby all adaptations, modifications and arrangements thereof which come within the practice of those skilled in the art to which the invention relates.

I claim:

1. A gage for checking the I.D. and O.D. of articles of manufacture comprising two spaced apart body members, a mounting pin extending through the two spaced apart body members and serving to adjustably space said two spaced apart body members one from the other, said pin having screw threads over an enlarged diameter portion thereof which threadedly engage one of said two spaced apart body members, said pin having a reduced diameter end portion rotatably engaged with the other of said two spaced apart body members, fastening means threadedly engaged with said end portion and adapted to prevent axial movement of said pin relative to said other of said two spaced apart body members, means fixedly secured to the enlarged diameter end of said pin for rotating said pin to thereby adjustably space said one of said two spaced apart body members from the other, a lock nut threadedly engaged with the enlarged diameter portion of said pin and adapted to bear against said one of said two spaced apart body members to thereby lock said pin and said one of said two spaced apart body members in position relative to one another, two spaced apart finger members secured to one side of the body members and shaped to provide step portions which define go and no-go gaging surfaces for the I.D. of the article to be tested, and two spaced apart finger members secured to the opposite side of the body members, one of the last named finger members being shaped to provide a step portion which defines go and no-go gaging surfaces for the O.D. of the article to be tested.

2. A gage for checking the I.D. and O.D. of articles of manufacture, said gage comprising two spaced apart members together constituting a body portion of the gage, a mounting pin extending through said two spaced apart members and provided with screw threads over an enlarged diameter portion thereof which threadedly engage one of said two spaced apart members, said pin having a reduced diameter end portion rotatably engaged with the other of said two spaced apart members, fastening means threadedly engaged with said end portion and adapted to prevent axial movement of said pin relative to said other of said two spaced apart members, means fixedly secured to the enlarged diameter end of said pin for rotating said pin to thereby adjustably space said one of said two spaced apart members from the other, a lock nut threadedly engaged with the enlarged diameter portion of said pin and adapted to bear against said one of said two spaced apart members to thereby lock said pin and said one of said two spaced apart members in position relative to one another, finger members secured to the sides of the two spaced apart members and extending laterally therefrom, said finger members being shaped to provide article receiving step portions which define go and no-go gaging surfaces for said article, and a plurality of pin members extending through said two spaced apart members and serving to align said two spaced apart members.

References Cited in the file of this patent

UNITED STATES PATENTS

| | | |
|---|---|---|
| 364,913 | Emery | June 14, 1887 |
| 915,473 | Petit | Mar. 16, 1909 |
| 1,393,233 | Martell | Oct. 11, 1921 |
| 1,491,098 | Hoke | Apr. 22, 1924 |
| 1,897,774 | Sunnen | Feb. 14, 1933 |
| 2,000,535 | Peisch | May 7, 1935 |

FOREIGN PATENTS

| | | |
|---|---|---|
| 263,360 | Germany | Aug. 7, 1913 |
| 909,385 | France | Dec. 20, 1945 |